United States Patent
Tanaka (10) Patent No.: US 6,273,822 B1
(45) Date of Patent: Aug. 14, 2001

(54) COMPUTER-READABLE RECORDING MEDIUM, GAME CONTROLLING METHOD AND GAME APPARATUS

(75) Inventor: Hiromichi Tanaka, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,712

(22) Filed: Mar. 30, 2000

(30) Foreign Application Priority Data

Jul. 14, 1999 (JP) .................................................. 11-200167

(51) Int. Cl.[7] ........................................................ A63F 9/24
(52) U.S. Cl. .................................................. 463/43; 463/7
(58) Field of Search ................................ 463/2, 7, 1, 15, 463/23, 37, 43, 44

(56) References Cited

U.S. PATENT DOCUMENTS

| | | | |
|---|---|---|---|
| 4,575,095 | * | 3/1986 | Gaster .................................... 273/253 |
| 5,580,308 | * | 12/1996 | Nakamura ................................ 463/7 |
| 5,649,862 | * | 7/1997 | Sakaguchi et al. ..................... 463/44 |
| 6,132,315 | * | 10/2000 | Miyamoto et al. ..................... 463/43 |
| 6,146,277 | * | 11/2000 | Ikeda ....................................... 463/43 |

* cited by examiner

*Primary Examiner*—Jessica J. Harrison
*Assistant Examiner*—Kim T. Nguyen
(74) *Attorney, Agent, or Firm*—Greenblum & Bernstein, P.L.C.

(57) ABSTRACT

A cumulative point value and a comparative point value are set for the player character and the enemy character. After execution of a player character action, the cumulative point value is updated on the basis of a set point value previously correlated with the executed action. After execution of an enemy character action, the comparative point value of the enemy character is updated on the basis of a reference point value previously correlated with the enemy character having executed the action. Upon completing the update of the cumulative point value, it is compared to the comparative point value. If the cumulative point value is smaller, a manual input for the player character is received. An action is set accordingly, and the set action is executed. If the comparative point value is smaller, an action for the enemy character is set on the basis of an artificial intelligence algorithm for the enemy character and executed.

9 Claims, 10 Drawing Sheets

| KIND OF ACTION | | SETTING POINT |
|---|---|---|
| ATTACK | WEAK | 1 |
| | MEDIUM | 2 |
| | STRONG | 3 |
| DEFENSE | | 0 |

FIG. 4

| CUMULATIVE POINT VALUE | | 6 |
|---|---|---|
| COMPARATIVE POINT VALUE | ENEMY CHARACTER A | 11 |
| | ENEMY CHARACTER C | 9 |
| | ENEMY CHARACTER D | 17 |
| | ⋮ | ⋮ |

| KIND OF ENEMY CHARACTER | REFERENCE POINT VALUE |
|---|---|
| ENEMY CHARACTER A | 8 |
| ENEMY CHARACTER B | 5 |
| ENEMY CHARACTER C | 10 |
| ENEMY CHARACTER D | 7 |
| ⋮ | ⋮ |

| INPUT SEQUENCE | KIND OF ACTION | EXECUTION FLAG |
|---|---|---|
| 1 | WEAK (ATTACK) | 1 |
| 2 | WEAK (ATTACK) | 1 |
| 3 | MEDIUM (ATTACK) | 0 |
| 4 | STRONG (ATTACK) | 0 |
| 5 | — | — |
| 6 | — | — |
| 7 | — | — |
| ATTACKER | PLAYER CHARACTER A | 233 |
| ATTACKED | ENEMY CHARACTER C | 234 |

FIG. 14

COMPUTER-READABLE RECORDING MEDIUM, GAME CONTROLLING METHOD AND GAME APPARATUS

BACKGROUND OF THE INVENTION

1. Field of the Invention

The present invention relates to a recording medium storing a program for controlling a video game, a controlling method of a video game and a game apparatus.

2. Description of the Related Art

There are available a number of kinds of games provided by video games. Among others, there are video games in which battles between characters, including player characters operated by a player and enemy characters controlled by a computer, are displayed on a display screen.

In a video game of this kind, there are set actions that are executed, such as attack, defense and use of an item executed by a player character or an enemy character, in response to manual input from the player, or in accordance with an algorithm for controlling actions of the characters contained in a game program. Execution of an action means executing display, audio output or battle calculation corresponding to an action performed during the game by the player character or the enemy character.

Processing regarding an action of the player character, i.e., receiving of manual input is thus started, and the period for which processing of the action of the player character set in response to the manual input is defined in this specification as an action turn of the player character. Further in this specification, an action of the enemy character is set in accordance with a process regarding the action of the enemy character, or more specifically, in accordance with an algorithm for controlling actions of the characters contained in the game program, and the period for execution thereof is defined as an action turn of the enemy character.

There are conventionally available the following two controlling techniques for switching over between an action turn of the player character and an action turn of the enemy character in the aforementioned video game. The first technique comprises the steps of executing an action turn of the enemy character after the completion of an action turn of the player character, and then, executing an action turn of the player character: the technique is to alternately execute an action turn of the player character and an action turn of the enemy character. The second technique is to set a waiting time from the completion of a current action turn of a character until the start of the next action turn for each of the player character and the enemy character, and control the execution of the action turn of each character on the lapse of time.

The technique of switching over between the action turn of the player character and the action turn of the enemy character is poor, however, in actual feeling of a battle scene, since the actions of the player character and the enemy character always execute alternately. In the technique of controlling the execution of the action turns of the individual characters on the basis of the lapse of time, a period of time during which an instruction of an action cannot be issued to the player character may sometimes occur, and the progress of the same may take a lot of time.

In order to improve game excitement and operability in such a game, it is important to increase the actual feeling in a battle scene, and ensure efficient progress of the game. For this purpose, it is necessary to design a control technique for switching over between the action turn of the player character and the action turn of the enemy character.

SUMMARY OF THE INVENTION

The present invention was developed in view of the above-mentioned circumstances, and has an object to more efficiently switch over between the action turns of the player character and the enemy character, thereby increasing the game excitement, and ensuring a higher efficiency of game progress.

To achieve the aforementioned object, the present invention provides a computer-readable recording medium storing a program of a game in which a battle between a player character and an enemy character is performed by executing a process regarding actions of the player character instructed in response to a manual input, or a process regarding actions of the enemy character instructed in accordance with a predetermined algorithm. The program is based on a process including executing a process regarding actions of the player character in response to a manual input; and updating a battle point value for the player character in response to a point value corresponding to an executed action of the player character. The point values are previously assigned to individual actions of the player character. The process also includes comparing the updated battle point value of the player character and a previously set battle point value of the enemy character; and determining a process to be executed for an action of either the player character or the enemy character.

This aspect of the invention may have a configuration in which, when execution of the process regarding an action of the enemy character is determined, the currently set battle point value of the enemy character may be updated in response to a prescribed reference value upon the completion of execution of the process.

This aspect of the invention may also have a configuration in which an instructed action of the player character in response to a manual input is registered in a memory prior to executing the process regarding action of the character. When execution of a process regarding the enemy character is determined after determination of the process regarding the actions, registration of an action not as yet executed from among actions of the player character registered in the memory is cancelled. When execution of a process regarding an action of the player character is determined, the process regarding an action of the player character registered in the memory and not as yet executed is executed.

Further, this aspect of the invention may have a configuration in which, when there are a plurality of enemy characters, the battle point value of the enemy character is provided for each of the enemy characters; and battle point values are compared between the player character and the individual enemy characters in the comparing step. In the determination of a process regarding actions, there is determined a process to be executed regarding actions of any of the player actions of either the player characters or the individual enemy characters in response to the result of comparison, in the determination of the process regarding actions.

This aspect of the invention may have a configuration in which, when there are multiple player characters, only one battle point value for the player character is provided for all the player characters; in updating, the battle point value of the player character is updated in response to the point value corresponding to an action of any player character. When execution of a process regarding actions of the player character is determined, the process regarding action of the player character instructed in response to a manual input is executed.

Another aspect of the invention provides a controlling method of a game in which a battle between a player character and an enemy character is performed by executing a process regarding actions of the player character instructed in response to a manual input, or a process regarding actions of the enemy character instructed in accordance with a predetermined algorithm. The method includes executing a process regarding actions of the player character in response to a manual input; and updating a battle point value for the player character in response to a point value corresponding to an executed action of the player character. The point values are previously assigned to individual actions of the player character. The method also includes comparing the updated battle point value of the player character and a previously set battle point value of the enemy character; and determining a process to be executed for an action of either the player character or the enemy character.

This aspect of the invention may have a configuration in which, when execution of the process regarding an action of the enemy character, the currently set battle point value of the enemy character is updated in response to a prescribed reference value upon the completion of execution of the process.

This aspect of the invention may have a configuration in which an instructed action of the player character in response to a manual input is registered in a memory prior to executing the process regarding action of the character. When execution of a process regarding the enemy character is determined after determination of the process regarding the actions, registration of an action not as yet executed from among actions of the player character registered in the memory is cancelled. When execution of a process regarding an action of the player character is determined, the process regarding an action of the player character registered in the memory and not as yet executed is executed.

This aspect of the invention may have a configuration in which, when there are a plurality of enemy characters, the battle point value of the enemy character is provided for each of the enemy characters and battle point values are compared between the player character and the individual enemy characters in the comparing step. In the determination of a process regarding actions, there is determined a process to be executed regarding actions of the player character and the individual enemy characters in response to the result of comparison, in the determination of the process regarding actions.

Further, this aspect of the invention may have a configuration in which, when there are multiple player characters, only one battle point value of a player character is provided for all the player characters. In updating, the battle point value of the player character is updated in response to the point value corresponding to an action of any player character. When execution of a process regarding actions of player character is determined, the process regarding action of the player character instructed in response to a manual input is executed.

Further another aspect of the invention provides a game apparatus comprising a computer controlling a game; and a recording medium recording a program for controlling the computer game. The program causes the computer to execute a process regarding actions of a player character in response to a manual input to any player character, and display the manner of actions of the player character. The program also causes the computer to determine whether or not prescribed interrupting conditions for causing an action of the enemy character are satisfied upon the completion of execution of the process regarding the action of the player character; and when the prescribed interrupting conditions are determined to be satisfied, display the manner of action of the enemy character by executing the process regarding any action of the enemy character. When the prescribed interrupting conditions are not determined to be satisfied, the computer permits receiving of a manual input to any player character.

This aspect of the invention may have a configuration in which a varying action point value is assigned to each of the actions of the player character and actions of the enemy character. In the determination, when the action point value of the enemy character is superior to the action point value of the player character, the prescribed interrupting conditions are determined to be satisfied.

BRIEF DESCRIPTION OF THE INVENTION

DESCRIPTION OF THE PREFERRED EMBODIMENTS

An embodiment of the present invention will now be described in detail with reference to the drawings. While the following description covers application of the invention to a home game apparatus, the invention is not limited to home game apparatuses.

Figure 1:
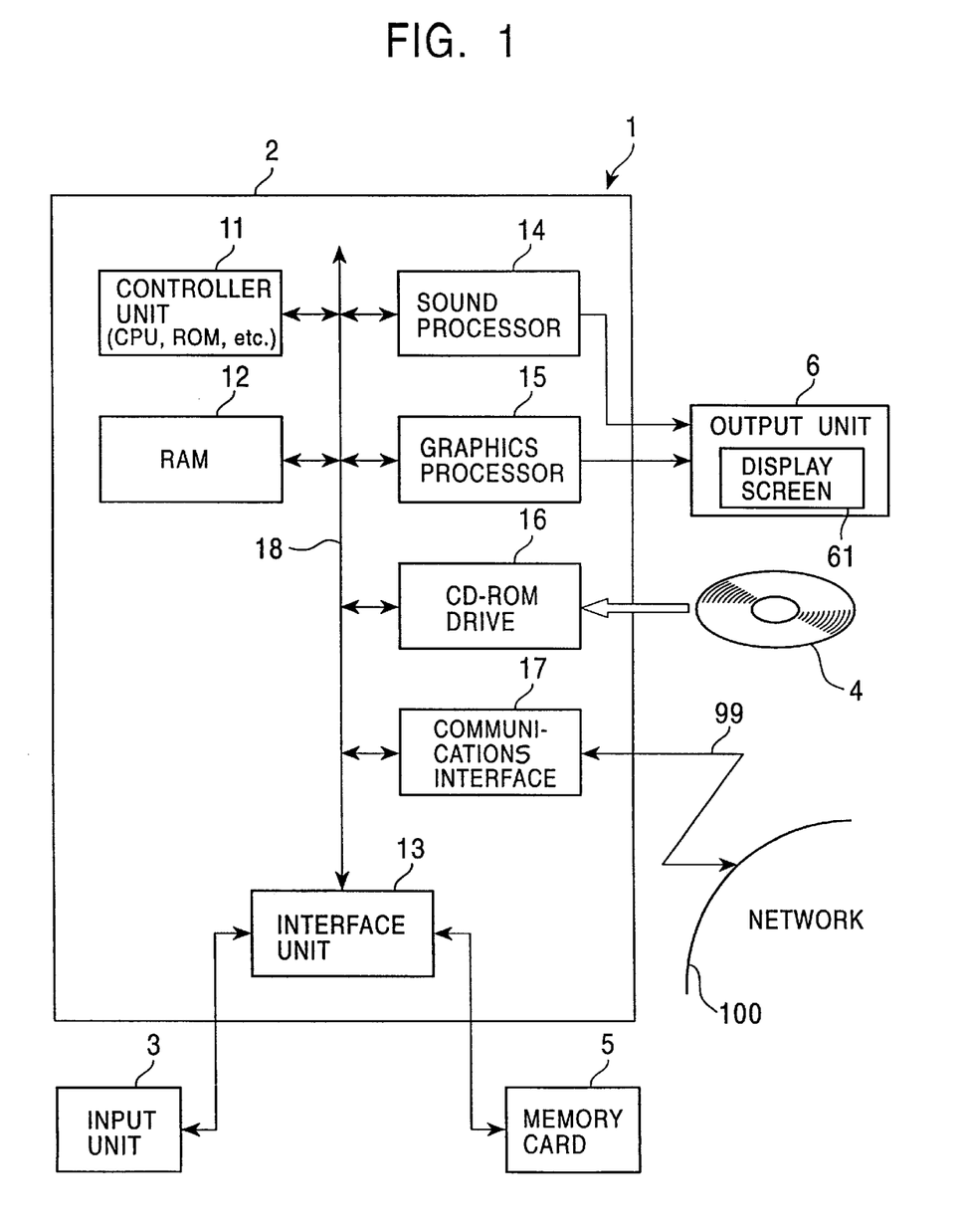
FIG. 1 is a block diagram illustrating an exemplary configuration of the game apparatus of the present invention.

FIG. 1 is a block diagram illustrating an example configuration of the game apparatus of the invention.

A game apparatus 1 broadly comprises, for example, a game apparatus main unit 2 having main functions of the game apparatus 1, an input unit (controller) 3 performing an input for operational instruction to the game apparatus main unit 2, a memory card 5 storing save data such as game progress data and game environment setting data, and an output unit 6 performing image display or sound output meeting the details of the game on the basis of image signals or audio signals from the game apparatus main unit 2.

The game apparatus main unit 2 is, for example, provided with a controller unit 11, a RAM (random access memory) 12, an interface unit 13, a sound processor 14, a graphics processor 15, a CD-ROM drive 16, a communications interface 17, and a bus 18 mutually connecting these components. The CD-ROM drive 16 has a configuration permitting mounting detachably a recording medium 4 such as a CD-ROM (compact disc read only memory), for example, storing a program for accomplishing processing regarding the game described later, image data and sound data.

The controller unit 11 is a circuit comprising a CPU (central processing unit) and a ROM (read only memory). The CPU controls all the component units in accordance with the program stored in the RAM 12 (or ROM as required).

The interface unit 13 can detachably connect the input unit 3 and the memory card 5. The interface unit 13 controls data transfer between various units (mainly the control unit 11) connected to the bus 18 and the input unit 3 or the memory card 5.

The sound processor 14 is a circuit having functions of generating a game BGM (background music) or acoustics. The sound processor 14 generates an audio signal on the basis of data stored in the RAM 12 in accordance with an instruction from the controller unit 11. The generated audio signal is sent as an output to the output unit 6.

The graphics processor 15 is provided with a frame buffer (not shown). The graphics processor 15 draws an image meeting an instruction from the controller unit 11 on the frame buffer. The graphics processor 15 generates video signals for displaying the image data of the image drawn on the frame buffer. The thus generated video signals are sent as an output to the output unit 6.

The CD-ROM drive 16 is a reader for reading out data stored in the CD-ROM serving as a recording medium 4. The game apparatus 1 causes the controller unit 11 to execute control in accordance with the game program recorded on the CD-ROM. This achieves control regarding the game as described later.

The communications interface 17 is a circuit conducting communications control upon data exchange between the same and the other units on the network 100. The communications interface is connected as required to a network 100 through a communications line 99.

Figure 2:
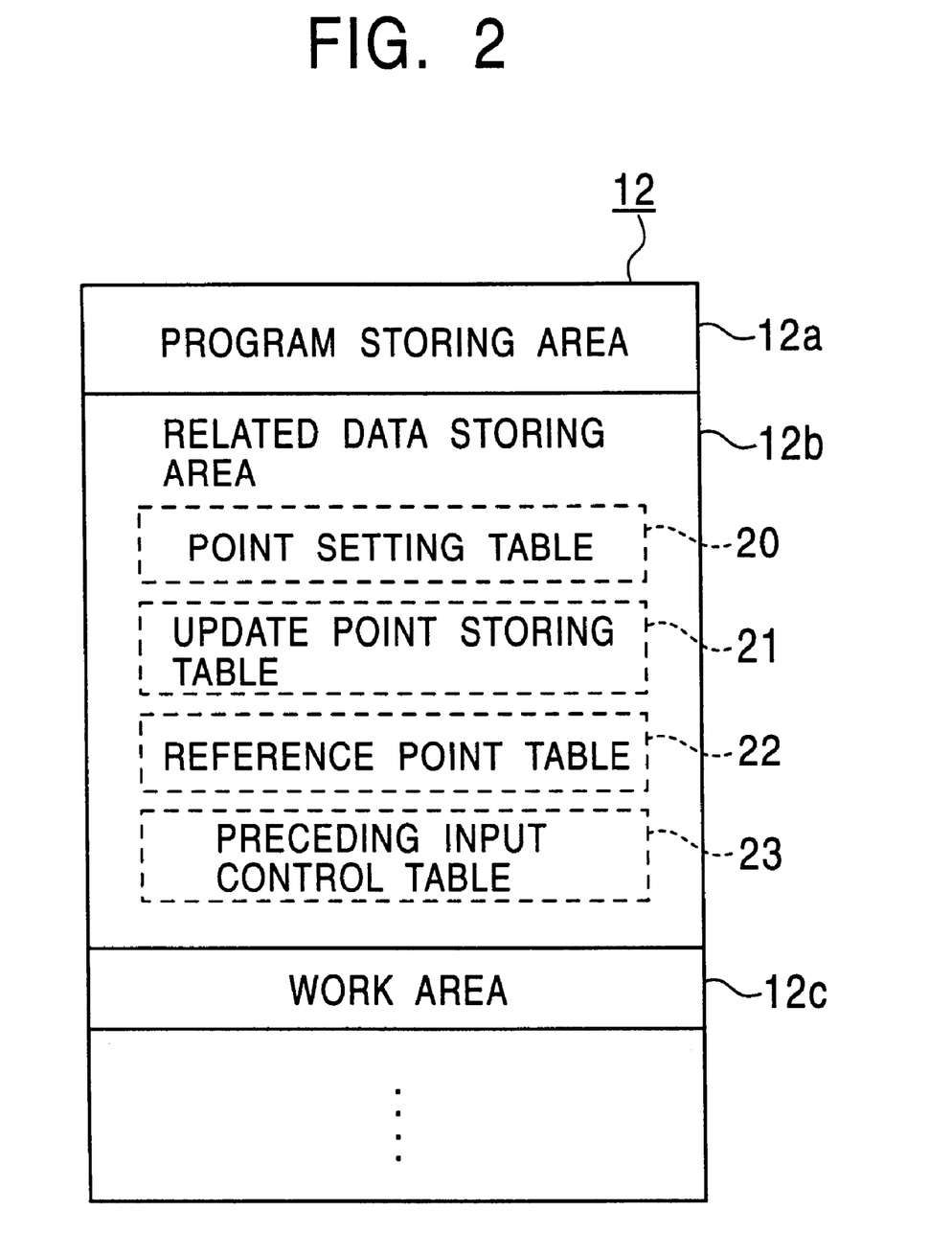
FIG. 2 illustrates an exemplary configuration of the RAM in an embodiment of the invention.

FIG. 2 illustrates an exemplary configuration of the RAM 12 shown in FIG. 1.

The RAM 12 has, for example, a program storing area 12a, a related data storing area 12b and a work area 12c. The program storing area 12a stores the program to be executed by the controller unit 11. The related data storing area 12b stores data necessary for executing various processes in the game including a point setting table 20 described later, an update point storing table 21, a reference point table 22 and a prior input control table 23.

Figure 3:
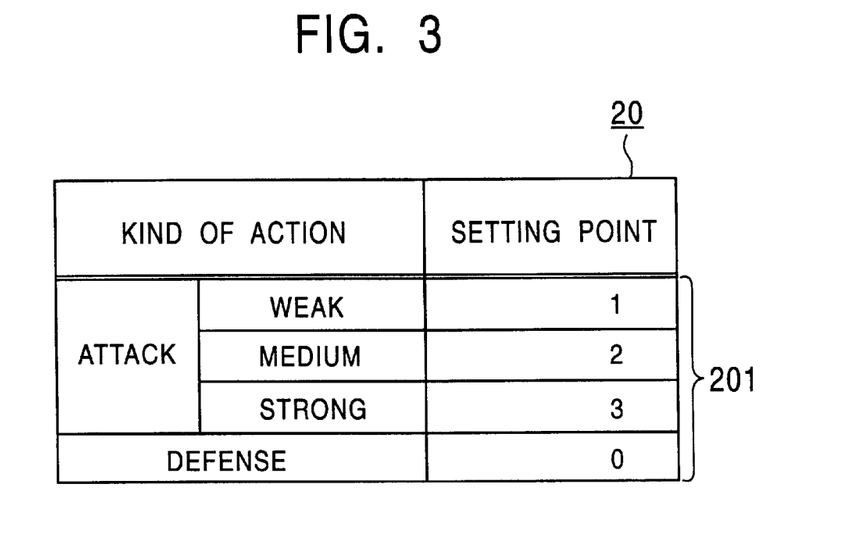
FIG. 3 illustrates an exemplary data structure of the point setting table stored in the RAM shown in FIG. 2.

FIG. 3 illustrates the data structure of the point setting table 20.

The point setting table 20 is a table storing a set value of points for each executable action of the player character. In this embodiment, when the player character executes an action, a cumulative point value (see FIG. 4) described later is updated in response to the point value set for that action. The point setting table 20 has a "setting point" column 201 storing point values previously set for each of such actions, for example, "weak" attack, "medium" attack, "strong" attack and defense.

According to the point setting table 20 of the example shown, for example, point values "1", "2", "3" and "0" are set for "weak" attack, "medium" attack, "strong" attack and defense, respectively. A point value may be set for other actions such as special attack and defense using magic, or use of an item, and may be stored in the point setting table 20.

Figure 4:
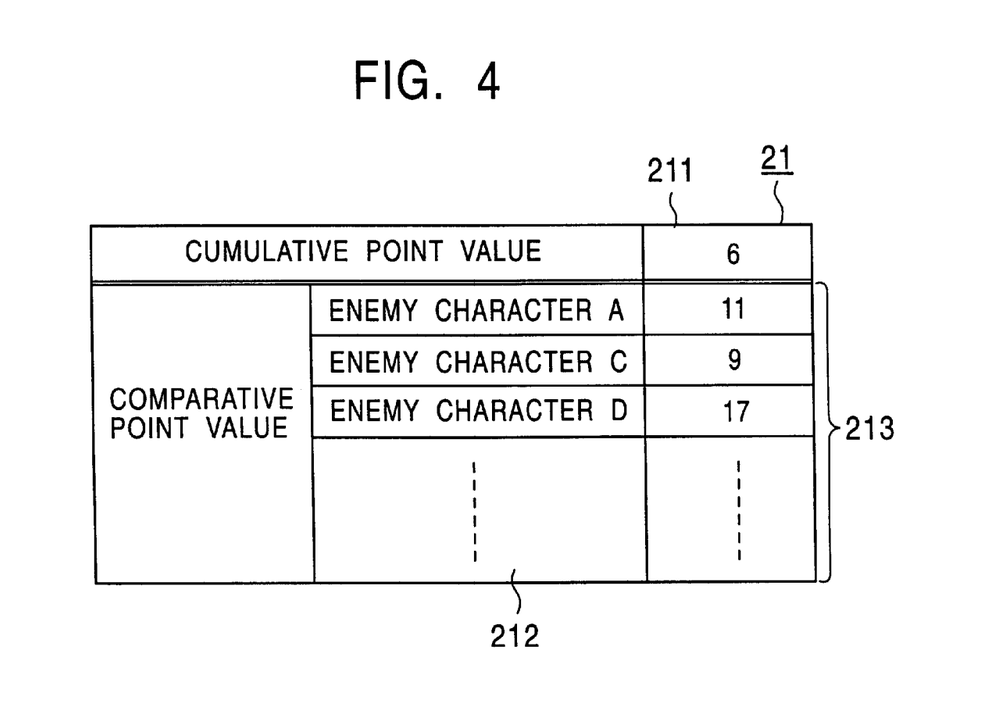
FIG. 4 illustrates an exemplary data structure of the update point storing table stored in the RAM shown in FIG. 2.

FIG. 4 illustrates the data structure of the update point storing table 21.

The update point storing table 21 is a table storing cumulative point values which are battle point values (or action point values) for the player character and comparative point values which are battle point values (or action point values) for the individual enemy characters. Further, the update point storing table 21 has a "cumulative point value" row 211, an "opponent" column 212, and a "comparative point value" column 213.

Values stored in the "cumulative point value" row 211 are reset to zero at the start of a battle. During battle processing, the value in the "cumulative point value" row 211 is updated upon every execution of an action of the player character to a value obtained by adding a point value corresponding to the executed action to the immediately preceding cumulative point value. When there are multiple player characters, the "cumulative point value" row 211 is common to all the player characters. That is, irrespective of which player character executes an action, the value in this "cumulative point value" row 211 is updated in response to the action.

However, when actions of all the player characters participating in the battle are defense, the cumulative point value is forcedly updated to a value that is closest to the current cumulative point value of the player characters from among the comparative point values of the individual enemy characters.

The "opponent" column 212 stores one or more kinds (ID) of enemy characters specified as opponents of the player characters at the start of each battle. If there are multiple enemy characters, a comparative point value is stored in the "comparative point value" column 213 for each enemy character. All the comparative point values are reset to zero at the start of the battle. Immediately after resetting, each comparative point value is updated to, for example, a value obtained by adding an initial value calculated by the use of the following formula (1) to zero. In formula (1), R represents a random value in a range of from 0.1 to 1.0:

$$\text{Initial value} = 10.5 + 10.5 \times R \tag{1}$$

As is clear from formula (1), the comparative point value of each enemy character is 11.55 (when R=0.1) on the minimum. In this embodiment, the cumulative point value is compared to the comparative point value of each enemy character immediately after update of the cumulative point value of the player character. A smaller cumulative point value leads to the action turn of the player character, and a smaller comparative point value leads to the action turn of the enemy character of the smaller comparative point value. A battle is therefore prevented from beginning with the action turn of each enemy character by setting the comparative point value to at least 11.55 immediately upon starting the battle.

In this embodiment, the maximum point value set for an action of the player character is "3" corresponding to "strong" attack according to the point setting table 20. With this in view, a constant of "10.5" is prescribed in the aforementioned formula (1). That is, the above formula (1) is used in a case where three player characters participate in the battle. Even when "strong" attack is set for all the player characters, the enemy character is prevented from delivering an attack first. Therefore, when the number of player characters participating in the battle is assumed to be X, the above formula (1) can be expressed as follows:

$$\text{Initial value}=3.5 \times X + 3.5 \times X \times R \quad (2)$$

Figure 5:
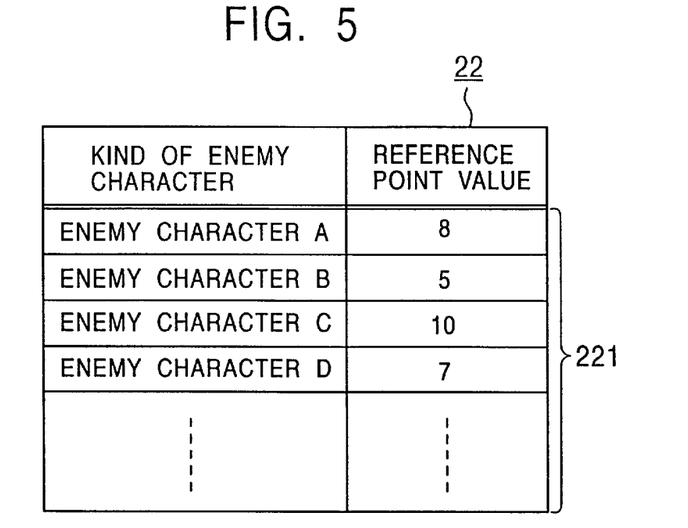
FIG. 5 illustrates an exemplary data structure of the reference point table stored in the RAM shown in FIG. 2.

The value in the "comparative point value" column 213 during battle processing is updated to a value obtained by adding a point value corresponding to the enemy character executing an action to the immediately preceding cumulative point value upon every execution of action for each of the enemy characters. The point value to be added is calculated by the use of a reference point value predetermined for each enemy character and a random number. The random point value is stored in the reference point table 22 described later.

FIG. 5 illustrates the data structure of the reference point table 22.

The reference point table 22 is a table storing reference point values for all the enemy characters who may fight a battle with the player character during the game. The reference point value is a kind of battle force parameter set for the enemy characters and a point value serving as a reference when updating the comparative point value of the enemy character. The reference point table 22 has a configuration provided with a "reference point value" column 221 storing a reference point value for each enemy character.

Figure 6:
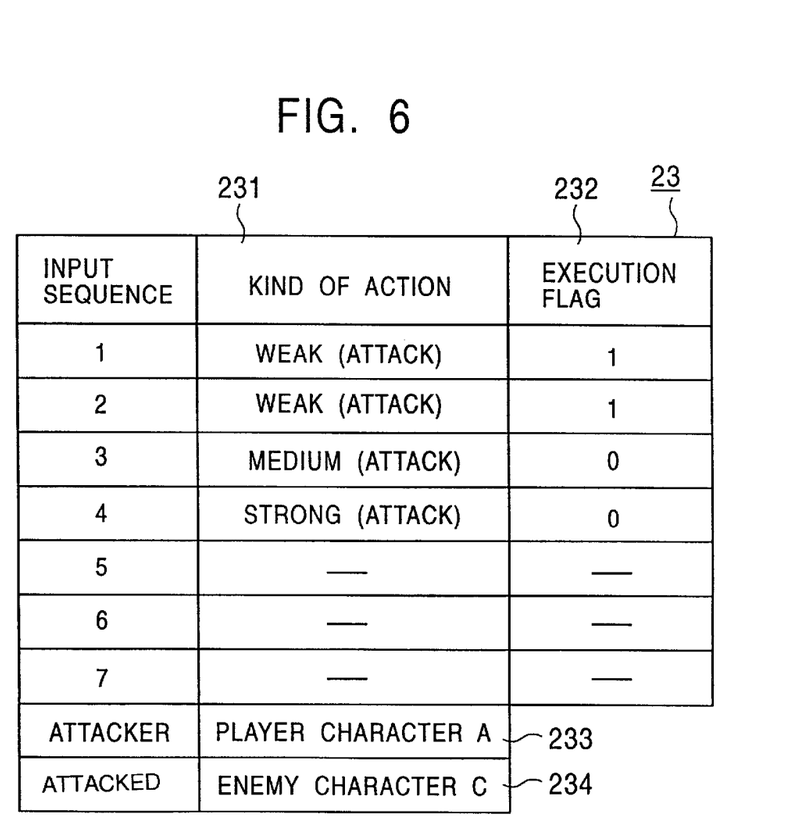
FIG. 6 illustrates an exemplary data structure of the prior input control table stored in the RAM shown in FIG. 2.

FIG. 6 illustrates the data structure of the prior input control table 23.

The prior input control table 23 is a table for registering, in the input sequence, the actions of the player character instructed by a manual input to execute. In this embodiment, it is permitted to register multiple runs of action until, for example, the total point value corresponding to the action reaches up to seven upon entering a run of action for a single player character only in the case of "strong", "medium" and "weak" attacks. For example, since the point value of "weak" attack is "1", it is possible to register up to seven runs of "weak" attack. Entering multiple actions previously at a stretch as described above is referred to as the "prior input". A prior input may be conducted so that the total point value resulting from the prior input becomes up to six.

The prior input control table 23 has a confirmation comprising a "kind of action" column 231, an "execution flag" column 232, an "attacker" row 233 and an "attacked" row 234. The "kind of action" column 231 stores kinds of action registered in the input sequence. The "execution flag" column 232 stores "0" or "1". A flag "1" represents the fact that execution has been completed, and a flag "0" means that execution has not as yet been completed. The "attacker" row 233 stores the name (or ID) of the player character serving as the attacker. The "attacked" row 234 stores the name (or ID) of the enemy character being attacked.

Switching operation of action turn between the player and enemy characters in a battle will now be described. For easy explanation, it is assumed that one player character and one enemy character participate in the battle.

Figure 7:
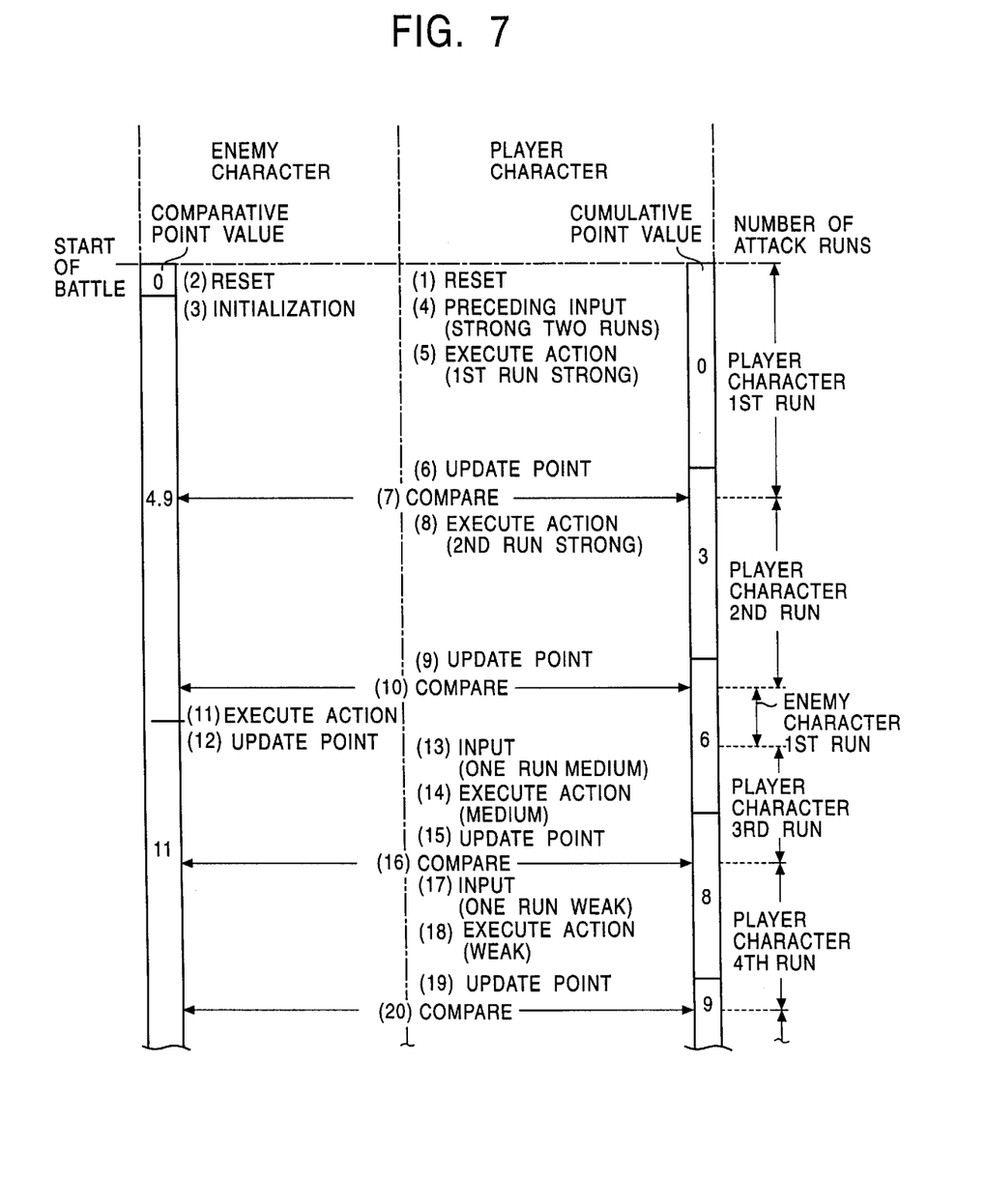
FIG. 7 is a chart for explaining the switching operation of the action turn in an embodiment of the invention.

FIG. 7 is a chart illustrating switching of action turns between the player and enemy characters during a battle. In FIG. 7, figures in parentheses represent sequences of actions. The following description is made with reference to the figures in parentheses in FIG. 7.

(1) As a result of the initialization performed at the start of the battle, the values in the "cumulative point value" row 211 of the update point storing table 21 are reset to zero.

(2) As a result of the initialization performed at the start of the battle, values in the "comparative point value" column 213 of the update point storing table 21 are reset to zero.

(3) An initial value of the comparative point value is calculated by the use of the aforementioned formula (2). In the example shown, the initial value is, for example, "4.9", which is added to zero stored in the "comparative point value" 213, and the value of the "comparative point value" column 213 is updated to "4.9".

(4) An operation conducted by the player causes input of an action to be performed by the player character. In the example shown, for instance, two runs of "strong" attack are previously entered.

(5) In the input sequence, the action entered first, i.e., the first "strong" attack in this case is executed.

(6) After the completion of execution of the action, a set point corresponding to the executed action ("3" in this case) is added to zero stored in the "cumulative point value" row 211, and thus the cumulative point value is updated to "3".

(7) The cumulative value and the comparative point value are compared.

(8) As a result of comparison, the cumulative point value (3) is smaller than the comparative point value (4.9). The second run of "strong" attack is executed from among the previously entered actions.

(9) After the completion of execution of the action, a set point corresponding to the executed action ("3" in this case) is added to "3" stored in the "cumulative point value" row 211, and the cumulative point value is thus updated to "6".

(10) The cumulative point value and the comparative point value are compared again.

(11) As a result of comparison, the comparative point value (4.9) is smaller than the cumulative point value (6). Action of the enemy character is therefore set on the basis of a predetermined artificial intelligence algorithm for the enemy character. The set action is then executed.

(12) After the completion of the action, a value to be added to set a next comparative point value of the enemy character is calculated by the use of a reference point value. The value to be added ("6.1" in this case) is added to "4.9" stored in the "comparative point value" column 213, thus updating the comparative point value to "11".

(13) At this point, it becomes possible to instruct the player character to input the next action to be executed. As a result, for instance in the example shown, a run of "medium" attack is entered. In this case, a plurality of runs of attack may be pre-entered.

(14) The entered "medium" attack is executed. When multiple runs of attack are entered, execution is performed in the input sequence.

(15) After the completion of execution of the action, a set point ("2" in this case) corresponding to the executed action is added to "6" stored in the "cumulative point value" row 211, thus updating the cumulative point value to "8".

(16) The cumulative point value and the comparative point value are compared again.

(17) As a result of comparison, the cumulative point value (8) is smaller than the comparative point value (11). It becomes therefore possible to instruct the player character to input the next action to be executed. As a result, for instance in the example shown, a run of "weak" attack is entered. In this case, multiple runs of attack may be pre-entered.

(18) The entered "weak" attack is executed. When multiple runs of attack are pre-entered, execution is performed in the input sequence.

(19) After the completion of execution of the action, a set point ("1" in this case) corresponding to the executed action is added to "8" stored in the "cumulative point value" row 211, thus updating the cumulative point value to "9".

(20) The cumulative point value and the comparative point value are compared again. Subsequently, the action turn is switched over in the same manner.

In the switching operation of the action turn described above, when switching is made to the action turn of the enemy character upon the completion of execution of an action in the middle of actions pre-entered for the player character, actions not as yet executed from among the actions already entered are cancelled. As a result, it is possible to instruct the player character to execute a new action that accounts for the enemy character's immediately preceding executing action as compared with the case where a series of pre-entered actions are executed in immediate succession after execution of actions by the enemy character. It is thus possible for the player to work out a new strategy while considering the immediately preceding actions of the enemy character.

When there are multiple opponent enemy characters, setting of a comparative point value, update of a comparative point value, and execution of actions are carried out for each of the enemy characters. Further, when there are multiple player characters covered by the operation by the player, input of actions, sequential execution of the entered actions, and update of the cumulative point value as a result of execution of actions are conducted for each of the player characters.

When there are multiple player characters covered by the operation of the player, and all the player characters execute a defense action, the cumulative point value is forcedly updated to the current comparative point value of the enemy character. When there are multiple opponent enemy characters, the cumulative point value is forcedly updated to the minimum comparative point value.

When all the player characters are doing a defense action in the progress of the game, in general, it is desirable to achieve a state in which a new action cannot be entered for the individual player characters until the enemy characters execute the next action. In this case, however, there occurs a period during which a new action cannot be entered for each player character, or a state in which progress of the battle is discontinued. To avoid these inconveniences, the aforementioned forced update of the cumulative point value is conducted.

Operations of the game apparatus 1 in this embodiment will now be described in detail.

The controller unit 11 reads out a program or data necessary for the execution of the game from the CD-ROM serving as a recording medium 4 through the CD-ROM drive 16 on the basis of the operating system stored in the incorporated ROM, and transfers the same to the RAM 12. The controller unit 11 accomplishes the following various processes by executing the program transferred to the RAM 12. Some of the control operations performed in the game apparatus 1 are carried out by circuits other than the controller unit 11 in cooperation with the controller unit 11. For easy explanation, the following description will be based on an assumption that all the control operations related with the controller unit 11 are directly carried out by the controller unit 11.

Actually, the program and data necessary for executing the game are read out from the CD-ROM serving as the recording medium 4 sequentially in response to the progress of processing in accordance with instructions from the controller unit 11, and transferred to the RAM 12. In the following description, however, to ensure easy understanding of the invention, details of reading of data from the CD-ROM or transfer to the RAM 12 are omitted.

When the player character encounters the enemy character during the progress of the game, battle processing which controls a battle between the player character and the enemy character is started. The battle processing includes battle initialization described later, prior input control processing and action executing processing. While the description of the flow throughout the entire battle processing is omitted, the battle processing comes to an end when prescribed battle ending conditions are satisfied, i.e., for example when any of one or more player characters and one or more enemy characters in a battle are annihilated.

Once the battle processing is started, battle initialization is started as an initialization processing thereof The battle initialization is executed for each battle.

Figure 8:
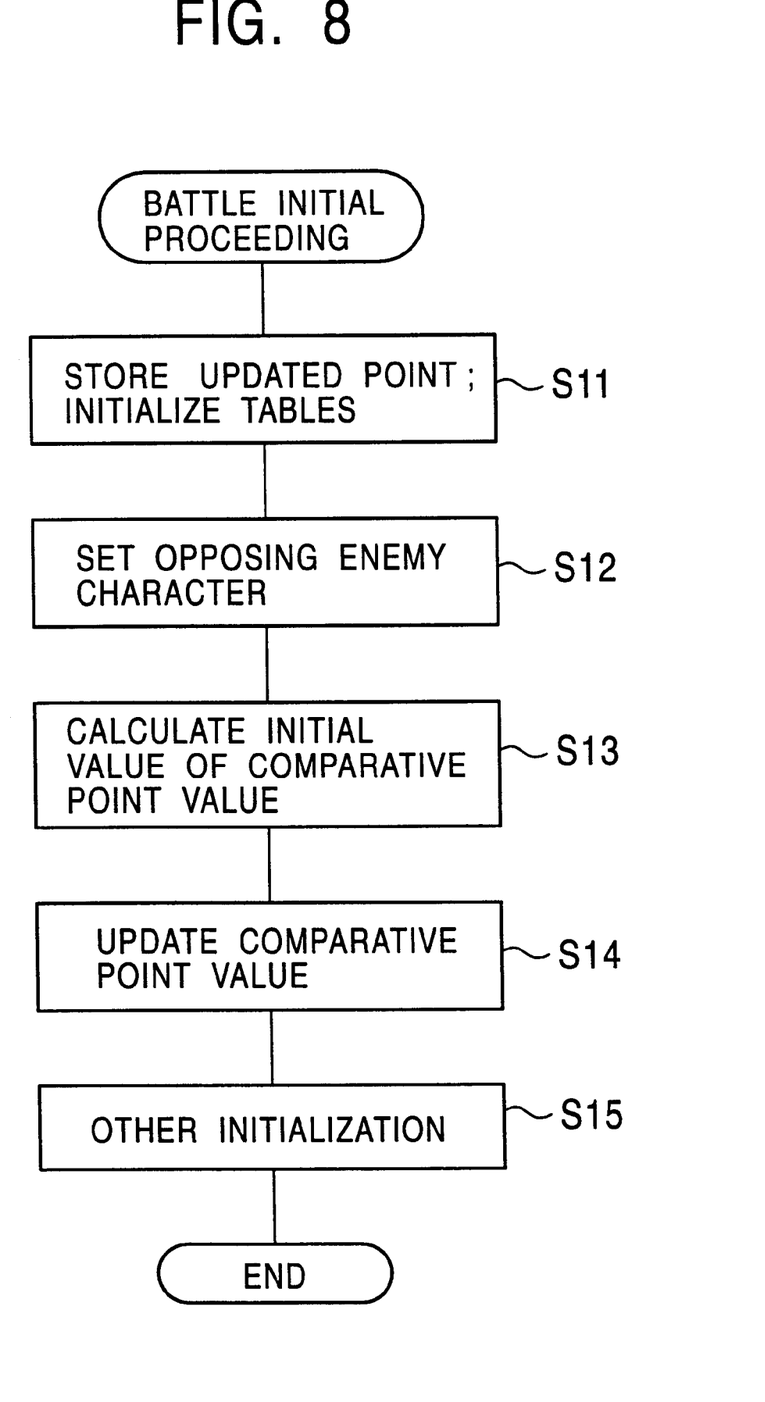
FIG. 8 is a flowchart illustrating the battle initialization in an embodiment of the invention.

FIG. 8 is a flowchart illustrating an exemplary battle initialization processing.

Upon start of battle initialization, the update point storing table 21 is first initialized. As a result, the value in the "cumulative point value" row 211 is reset to zero. Data in the "opponent" column 212 and the "comparative point value" column 213 are erased (step S11). One or more opponent enemy characters are set, and the names (or ID) thereof are stored in the "opponent" column 212 of the update point storing table 21 (step S12).

Then, initial values of comparative point values are calculated by the aforementioned formula (2) for the individual set enemy characters (step S13). The value in the "comparative point value" column 213 corresponding to each enemy character of the update point storing table 21 is updated on the basis of the resultant initial value of the comparative point value of each enemy character (step S14). After the other initial processes for battle processing such as switching to a battle mode screen (step S15), the battle initialization is completed, and the process returns to the battle processing.

The prior input control processing will now be described. The prior input control is a routine of controlling action input for one or more player characters in the battle processing. The prior input control is executed when the following three conditions are satisfied: first, the game is in battle processing after the completion of the battle initialization; second, a player character or an enemy character is not executing an action; and third, the game is not in a state of status abnormality in which action input is prohibited for all the player characters. When the three aforementioned conditions are satisfied again after the completion of the prior input control processing, the prior input control is executed from time to time.

Figure 9:
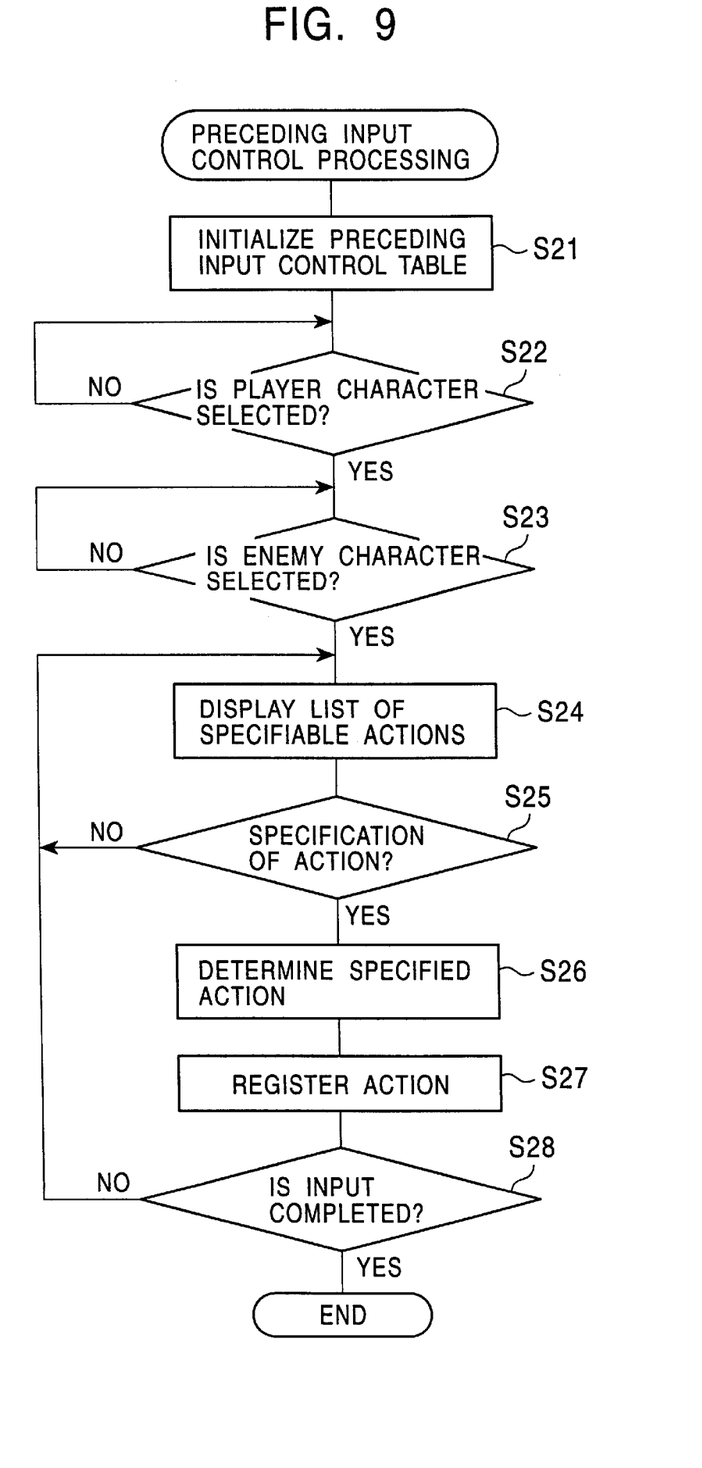
FIG. 9 is a flowchart illustrating the prior input control in an embodiment of the invention.

FIG. 9 is a flowchart illustrating exemplary prior input control processing.

Upon start of the prior input control, the prior input control table 23 is initialized. As a result, the registered data stored in the "kind of action" column 231, the "execution flag" column 232, the "attacker" column 233 and the "attacked" column 234 of the prior input control table 23 are erased (step S21).

When there are multiple player characters covered by operation by the player, it is determined whether or not the player character to be instructed to execute an action is selected by a manual input from among the player characters (step S22). When selection has not as yet been made, a waiting time is provided until selection is made. When there is only one player character, the player character is automatically selected, not dependent upon a manual input.

After selection of the player character, if there are multiple enemy characters, it is determined whether or not an enemy character serving as the attacked is selected by a manual input (step S23). If not selected, the waiting time continues until selection is made. When there is only one enemy character, the enemy character is automatically selected, not depending upon a manual input.

Then, the kinds of actions available to the selected player character are listed on the display screen (step S24). For example, the total number of settable points is up to seven. When a run of "strong" attack (set point value: 3) and a run of "medium" attack (set point: 2) have already been instructed, the settable means of attack would include one or two runs of "weak" attack, or one run of "medium" attack. In this case, therefore, the list of actions indicates only "weak" attack and "medium" attack, which are displayed as being selectable.

Then, it is determined whether or not an action has been instructed by a manual input from the listed actions capable of being selected (step S25). The actions are listed up until an action is instructed. Upon instruction of an action, the type of instructed action is discriminated (step S26). The player character executing the action (attacker), the enemy character receiving such execution of attack (attacked), and the type of instructed action are registered in the prior input control table 23 (step S27). When end of prior input is instructed by a manual input despite the possibility to instruct another action, or when a total value of points of the already instructed actions has reached the maximum value, or when a defense action or an action outside the range of prior input is instructed, the prior input control for this player character comes to an end (step S28).

When the prior input control processing is not discontinued, but an instruction of another action is issued, the above-mentioned steps S24 to S28 are repeated. As a result, more than one action instructed by prior input is sequentially registered for one player character. The registered actions are sequentially executed in the action execution process described later. When an action is registered in the prior input control table 23, an action executing processing is executed in parallel with the prior input control. That is, even before the completion of the prior input control, the actions are sequentially executed in the middle of prior input.

Action execution processing will now be described. The action execution processing is a routine of performing control regarding execution of actions of the player character on the basis of registered data concerning actions registered in the prior input control table 23. The action execution process is executed only when the following three conditions are satisfied: 1) battle processing is ongoing; 2) there are registered data not as yet executed in the prior input control table 23; and 3) the enemy character is not executing. The action execution process is executed, even during execution of the prior input control, in parallel therewith.

Figure 10:
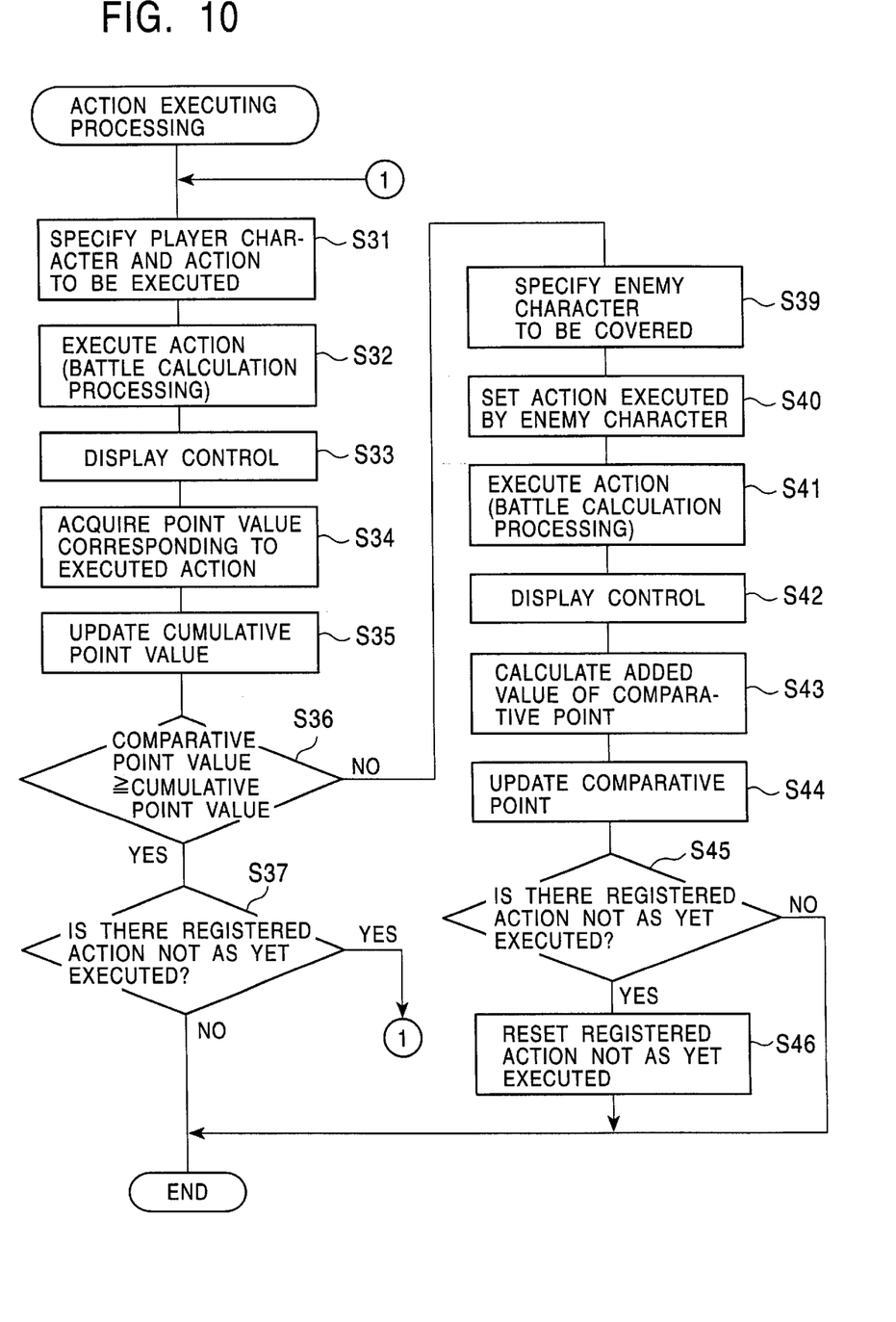
FIG. 10 is a flowchart illustrating the action execution processing in an embodiment of the invention.

FIG. 10 is a flowchart illustrating an exemplary action execution process.

Upon start of the action execution process, the prior input control table 23 is referenced. There is thus available registered data having a value of zero in the "execution flag" column 232 and having a high input priority (a small number representing the sequence). A player character to execute the action and the action in question are specified on the basis of the thus obtained data (step S31).

Then, the specified action of the player character is executed (step S32). More specifically, the amount of damage corresponding to the executed action and various parameters are calculated. Actions representing attack, defense and a damaged state of the player character and the enemy character, effects exerting on the background image, and the result of battle such as an amount of damage to the enemy character are displayed (step S33). Simultaneously with this, when acoustics is set, an output of acoustics is provided.

Subsequently, in the prior input control table 23, the execution flag of the registered data corresponding to the executed action is set to "1". The point setting table 20 is referenced to obtain a set point value corresponding to the executed action (step S34). The set point value thus obtained is added to the value of the "cumulative point value" row 211, thereby updating the cumulative point value (step S35).

After updating the cumulative points, the update point storing table 21 is referenced. The value in the "cumulative point value" row 211 is compared to the values corresponding to the individual enemy characters in the "comparative point value" column 213 (step S36). When the cumulative point value is under the comparative point value of each enemy character, the prior input control table 23 is referenced. It is determined whether or not there are registered data not as yet executed, or data of which the value in the "execution flag" column 232 is zero (step S37). When there are registered data not as yet executed, the process returns to step S31, and the aforementioned steps are repeated. In the absence of registered data not as yet executed, the action execution process is completed.

In step S36, on the other hand, when the comparative point value of one or more enemy characters is smaller than the cumulative point value, all the relevant enemy characters are specified as enemy characters to be instructed to execute an action (step S39). For each of the specified enemy characters, an action meeting the current game circumstances is set on the basis of a predetermined artificial intelligence algorithm for the enemy character (step S40).

Then, the action set for each enemy character is executed (step S41). More specifically, the amount of damage meeting the executed action and various parameter values are calculated. In addition, in response to the executed action, there are displayed actions representing attack, defense and state of damage of the enemy character or the player character, effects on the background image, and the result of battle including the amount of damage suffered by the player character (step S42). When an acoustics is set, there is provided an output thereof When there are multiple enemy characters participating in execution, actions are executed for each enemy character one by one.

Subsequently, the reference point table 22 is referenced to obtain a reference point value for the enemy character having executed the action. Using the obtained reference value and a random number value, a value to be added for setting the next comparative point value of this enemy character is determined through calculation (step S43). The comparative point value is updated by adding the resultant value to be added to the corresponding comparative point value of the enemy character stored in the "comparative point value" column 213 of the update point storing table 21 (step S44).

Then, the prior input control table is referenced, and it is determined whether or not there is an action not as yet executed (action having an execution flag value of zero) from among the actions registered by a prior input for the player character (step S45). In the absence of an action not executed, the action executing process is completed. If there is an action not as yet executed, the action executing process comes to an end after deleting that action from the prior input control table 23 (step S46).

After the completion of the action executing process in succession to steps S37, S45 and S46, the process returns to the battle processing. When the three aforementioned starting conditions of the prior input control are satisfied, the prior input control process is executed again, thus permitting instruction to the player character to execute an action.

Steps S39 to S46 may be treated as an action executing routine, and this action executing routine may be executed through interruption processing, i.e., interrupting the player's currently executing action. In this case, when the comparative point value is smaller than the cumulative point value for more than one enemy characters in step S36, it suffices to set occurrence of an interruption processing. The action executing routine of the enemy character is executed as an interrupting process on the condition that the occurrence of an interruption process is set, and it is during the period of action input for the player character (steps S39–S46).

A typical screen display during a battle will now be described.

FIGS. 11 to 14 illustrate typical screen displays of a video game to which the technique described in this embodiment is applied. While there is no particular limitation on the number of player characters and enemy characters, there are in this example three player characters and two enemy characters.

Figure 11:
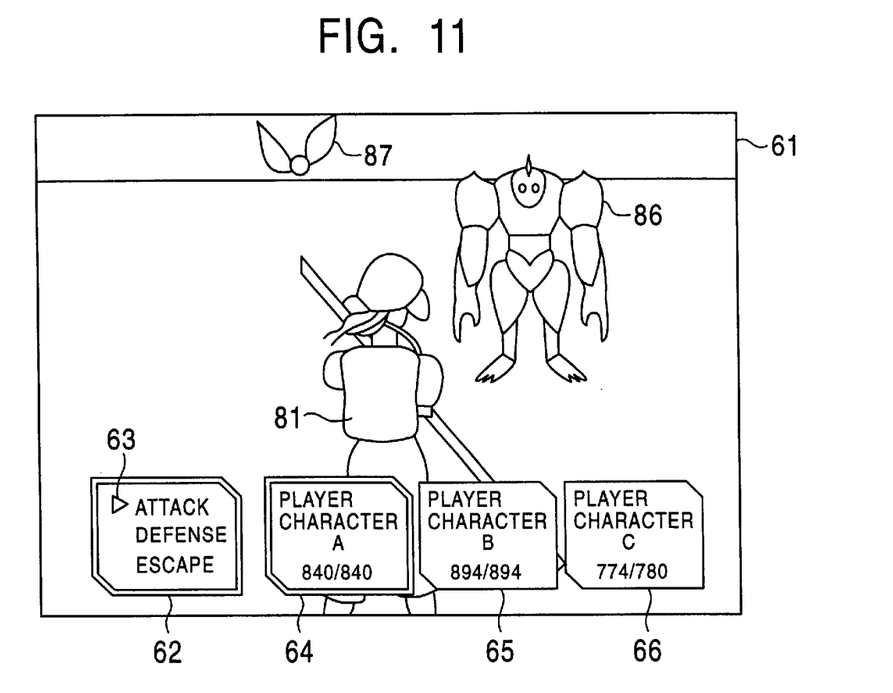
FIG. 11 illustrates a typical screen display displayed in an embodiment of the invention.

The screen display shown in FIG. 11 illustrates a state in which actions to be executed by player characters are selected in the prior input control process. On the display screen 61 of a display provided for the output unit 6, there is displayed an action selecting main window 62 displaying a list of the kinds of actions capable of being selected for the player characters and player character information windows 64, 65 and 66 displaying information about each player character. A player character 81 and enemy characters 86 and 87 are displayed on the display screen 61. In the example of the display shown in FIG. 11, the two remaining player characters are not displayed (this is also the case with FIG. 12).

The player character to be instructed to execute an action is selected by selecting and operating any one of the three player character information windows 64, 65 and 66 by means of a direction key of the input unit 3. The player character information window 64 corresponding to the selected player character has, for example, a window frame portion of a color different from those of the other windows 65 and 66. A kind of action to be executed is specified by moving a cursor 63 within a main window 62 for selecting an action with the direction key of the input unit 3.

When "attack" is selected from among the kinds of action listed within the main window 62 for selecting an action, a screen (FIG. 12) for selecting a type of attack is displayed.

Figure 12:
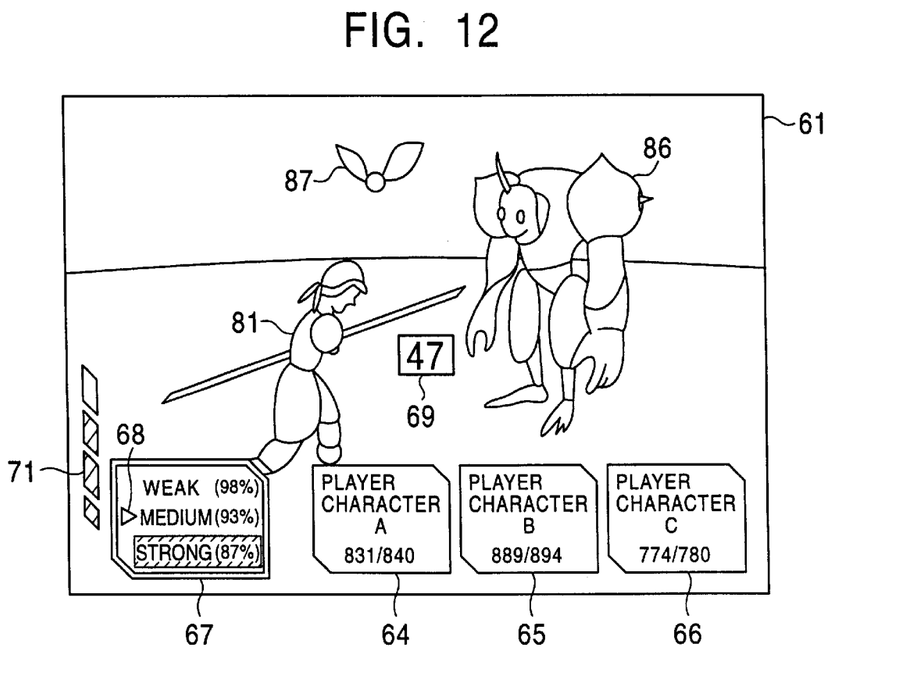
FIG. 12 illustrates a typical screen display displayed in an embodiment of the invention.

The example of the screen display shown in FIG. 12 represents the state in which an attack to be executed by the player character is selected in the prior input control process (step S25). A sub-window 67 for selecting an attack is displayed on the display screen 61. Within this sub-window 67, attacks capable of being selected for the player character are listed. More specifically, "weak", "medium" and "strong" attacks are displayed, together with numerical values expressing the hitting ratio (such as "98%"). Any of these attacks is selected by moving the cursor 68 within the sub-window 67 for selecting an attack by means of the direction key of the input unit 3.

For example, a prior input gauge 71 is displayed by the side of the sub-window 67 for selecting an attack. The prior input gauge 71 is a gauge for causing the player to visually recognize the total value of points of actions already entered in a run of prior input processing. In the example of the display shown in FIG. 12, three actions including "weak" attack (point: 1), "medium" attack (point: 2) and "medium" attack (point: 2) are already entered. In this case, since the remaining prior input is "2" (when the maximum point value is 7), it is impossible to select "strong" attack having a point value of "3". For the purpose of showing that "strong" attack cannot be selected, therefore, the display within the sub-window for selecting an attack is in a color different from those of "medium" and "weak".

When the action to be executed by the player character is attack, if more than one action is sequentially registered in the prior input control process, the registered actions are executed in succession even during performance of prior input (step S32). A status such as attack, defense or damaged state is displayed for the player character 81 or the enemy character 86, 87.

In the screen display shown in FIG. 12, a numerical display "47" 69 at the screen center represents the value of damage suffered by the enemy character 86 by the prior-entered attack delivered by the player character 81 (step S33). The figures shown in the player character information windows 64, 65 and 66 (such as "840/840") represent, for example, physical strength of the corresponding player character.

When the cumulative point value of the player character becomes larger than the comparative point value of the enemy character, an action is set against another enemy character having a comparative point value smaller than the cumulative point value, and is executed (step S41).

Figure 13:
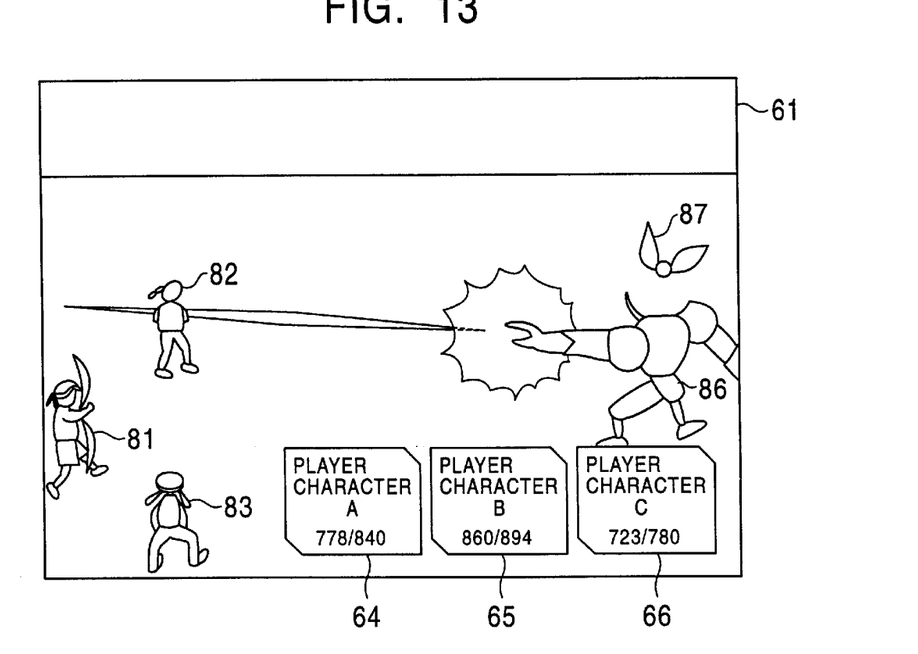
FIG. 13 illustrates a typical screen display displayed in an embodiment of the invention.
Figure 14:
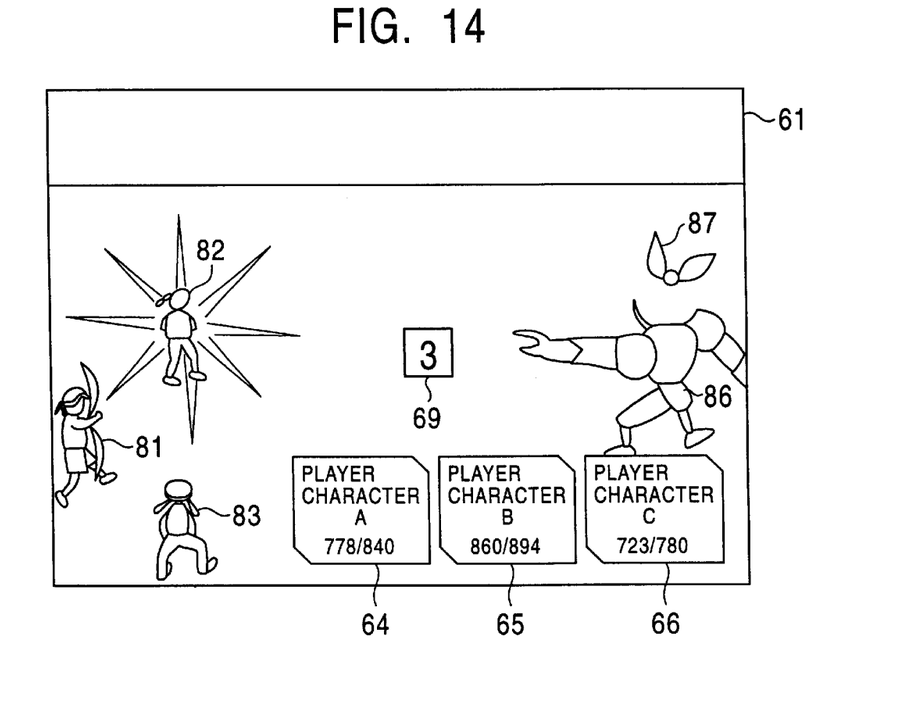
FIG. 14 illustrates a typical screen display displayed in an embodiment of the invention.

The display shown in FIG. 13 represents a state in which the enemy character 86 delivers a laser attack against the player character 82. FIG. 14 illustrates a screen display showing the result of a battle comprising the attack by the enemy character 86. In the example of the screen display shown in FIG. 14, a numerical value 69 of "3" representing an amount of damage suffered by the player character is displayed at the screen center as the result of a battle.

According to the embodiment presented above, a cumulative point value and a comparative point value are set for each of the player character and the enemy character, and after execution of an action by the player character, the cumulative point value is updated on the basis of a set point value previously correlated with the executed action. When the enemy character executes an action, a comparative point value is set on the basis of a reference point value previously correlated with the enemy character having executed the action. Upon updating the cumulative point value, it is compared to the comparative point value. Processing to cause the character having a smaller point value to execute the next action is executed. For example, in the case of a player character, a manual input to the player character is received, and an action is set in response to the manual input, to execute a series of processes up to execution of the set action. In the case of an enemy character, an action is set on the basis of an artificial intelligence algorithm for the enemy character, and a series of processes up to execution is executed.

It is therefore possible to more efficiently switch over the action turn between the player character and the enemy character. As a result, game excitement is improved and game progress can be made more efficient as compared with the conventional technique of alternately switching over the action turn between the player character and the enemy character or controlling the time between the action turns for each character.

According to the embodiment described above, it is possible to minimize occurrence of a period during which it is impossible to instruct the player character to execute an action, during execution of an action of the enemy character or during execution of an action by the player character by means other than a prior input.

According to the above-mentioned embodiment, the game program for achieving the present invention including battle initialization, prior input control and action execution is stored in a CD-ROM serving as a recording medium 4. It is therefore possible to easily distribute and sell the program in the form of a software product separately from the game apparatus main unit. By using this software product on hardware such as a computer, it is also possible to easily apply the game technique of the above-mentioned embodiment on such hardware.

The present invention has been described above in detail by means of an embodiment. The invention is not however limited to the above-mentioned embodiment, but it is needless to say that the invention can appropriately be modified within a range not deviating from the spirit of the present invention.

In the aforementioned embodiment, for example, a case is described where the invention is applied to a home game apparatus as the platform. The invention may however be applied to a general-purpose computer, such as a personal computer or an arcade game apparatus as a platform. A communications terminal such as a portable telephone set, a portable information terminal or a car navigation apparatus is also applicable as a platform.

In the above-mentioned embodiment, the program or data are stored in a CD-ROM, and this CD-ROM is used as a recording medium. The recording medium is not however limited to a CD-ROM, but may be a DVD (digital versatile disc) or other computer-readable magnetic or optical recording medium, or a semiconductor memory.

The program or data for achieving the present invention is not limited to a form provided by a recording medium such as a CD-ROM detachably mounted on a game apparatus or a computer. The program or data for achieving the invention may also be in the form of downloading from another device on a network 100 connected via a communication lines 99 by the use of a communications interface 17 shown in FIG. 1. It may also be in the form of recording the program or data in a memory on the other device side on the network 100 connected via the communications line 99, and using the same by storing the program or data sequentially in a RAM 12 as required via the communications line 99.

According to the present invention, when a process regarding an action of the player character is determined in response to a manual input, the battle point value of the player character is updated in response to the point value previously correlated with the action executed by the player character. The updated battle point value of the player character and the previously set battle point value of the enemy character are compared. Depending upon the result of this comparison, a process to be executed is decided for either the player character or the enemy character. When processing of the player character is determined, a manual input for the player character is received, and an action is accordingly set. A series of processes up to execution of the set action is executed. In the case of processing of the enemy character, an action is set on the basis of an artificial intelligence algorithm for the enemy character, and a series of processes up to execution thereof are executed.

More specifically, it is possible to switch over the action turn between the player character and the enemy character on the basis of the battle point values of the player character and the enemy character. Therefore, it is possible to more efficiently switch the action turn between the player character and the enemy character. As a result, game excitement is improved and the game progress can be made more efficient as compared with the conventional technique of alternately switching over the action turn between the player character and the enemy character, or controlling the time between action turns for each character.

The present disclosure relates to subject matter contained in priority Japanese Patent Application No. HEI 11-200167, filed on Jul. 14, 1999, the contents of which is herein expressly incorporated by reference in its entirety.

What is claimed is:

1. A computer-readable recording medium storing a program of a game in which a battle between a player character and an enemy character is performed by executing a process for player character actions instructed in response to a manual input, or a process for enemy character actions instructed in accordance with a predetermined algorithm; said program being based on a process comprising:

executing the process for player character actions in response to the manual input;

updating a battle point value for said player character in response to a point value corresponding to an executed player character action, point values being previously assigned to individual player character actions;

providing a battle point value of the enemy character for each of the enemy characters when there are a plurality of enemy characters;

comparing said updated battle point value of the player character and the previously set battle point values of the individual enemy characters; and determining a process to be executed for action of any of the player characters and said individual enemy characters in response to the result of the comparison.

2. The program according to claim 1, wherein, when execution of the process for enemy character actions is determined, the currently set battle point value of the enemy character is updated in response to a prescribed reference value upon completing execution of said process.

3. The computer program according to claim 1, further comprising registering in a memory instructed player character actions in response to the manual input prior to executing the process for player character actions;

cancelling registration of an action not yet executed from among actions of the player character registered in the memory when execution of the process for the enemy character is determined after determination of the process for player character actions; and executing the process for a player character action registered in said memory and not yet executed when execution of the process for player character actions is determined.

4. The computer program according to claim 1, further comprising providing a single player character battle point value when there are a plurality of player characters;

wherein the updating further comprises updating the player character battle point value in response to the point value corresponding to an action of any player character; and wherein the executing further comprises executing the process for player character actions instructed in response to the manual input.

5. A controlling method of a game in which a battle between a player character and an enemy character is performed by executing a process for player character actions instructed in response to a manual input, or a process for enemy character actions instructed in accordance with a predetermined algorithm, comprising:

executing the process for player character actions in response to the manual input;

updating a battle point value for said player character in response to a point value corresponding to an executed player character action, point values being previously assigned to individual actions of the player character;

providing said battle point value of the enemy character for each of the enemy characters when there are a plurality of enemy characters;

comparing said updated battle point value of the player character and the previously set battle point values of the individual enemy characters; and     determining a process to be executed for an action of any of said player character and said individual enemy characters in response to the result of the comparison.

6. The game controlling method according to claim 5, wherein, when execution of the process for enemy character actions is determined, the currently set battle point value of the enemy character is updated in response to a prescribed reference value upon completing execution of said process.

7. The game controlling method according to claim 5, further comprising: registering an instructed player character action in a memory in response to the manual input prior to executing the process for player character actions;

cancelling registration of an action not yet executed from among actions of the player character registered in the memory when execution of the process for enemy character actions is determined after determination of the process regarding the actions; and     executing the process for player character actions registered in said memory and not yet executed when execution of the process for an action of the player character is determined.

8. The game controlling method according to claim 5, further comprising providing a single player character battle point value for all of the player characters when there are a plurality of player characters;

wherein the updating further comprises updating said player character battle point value in response to the point value corresponding to any player character action; and     wherein the execution further comprises executing the process for player character actions instructed in response to the manual input.

9. A game apparatus comprising:

a computer controlling a game; and a recording medium storing a program for controlling the computer game;

said program causing said computer to:

execute a process for player character actions in response to a manual input to any player character, and display the player character actions;

determine whether prescribed interrupting conditions for causing an enemy character action are satisfied upon completing execution of the process for the player character actions; and     when said prescribed interrupting conditions are determined to be satisfied, display the enemy character action by executing the process for any enemy character action, and when said prescribed interrupting conditions are not determined to be satisfied, permit receiving of a manual input to any player character;

wherein a varying action point value is assigned to each action of the player character and action of the enemy character; and     in said determination, when the action point value of said enemy character is greater than the action point value of said player character, said prescribed interrupting conditions are determined to be satisfied.

\* \* \* \* \*